United States Patent [19]

Rothengass

[11] Patent Number: 5,413,277
[45] Date of Patent: May 9, 1995

[54] LIQUID-FILLED THERMOSTATIC SYSTEM

[75] Inventor: Wolfgang Rothengass, Limbach-Laudenberg, Germany

[73] Assignee: Alfred Buchta, Seeheim, Germany

[21] Appl. No.: 39,167

[22] PCT Filed: Jul. 18, 1991

[86] PCT No.: PCT/DE91/00590
§ 371 Date: Oct. 12, 1993
§ 102(e) Date: Oct. 12, 1993

[87] PCT Pub. No.: WO92/07314
PCT Pub. Date: Apr. 30, 1992

[30] Foreign Application Priority Data

Oct. 11, 1990 [DE] Germany .......... 40 32 285.8

[51] Int. Cl.⁶ ............................ G05D 23/12
[52] U.S. Cl. ............................ 236/42; 236/99 R
[58] Field of Search ................ 236/42, 99 R

[56] References Cited

U.S. PATENT DOCUMENTS

| Re. 18,345 | 2/1932 | Johnsson | 236/99 R X |
|---|---|---|---|
| 1,439,750 | 12/1922 | Nelson | 236/99 R |
| 1,941,359 | 12/1933 | Lawler | 236/42 |
| 1,999,732 | 4/1935 | Leins | 236/99 R |
| 2,045,332 | 6/1936 | Otto | 236/42 X |
| 3,108,747 | 10/1963 | Nielsen | 236/99 R |
| 3,156,413 | 11/1964 | Porland | 236/42 |
| 4,290,553 | 9/1981 | Molgaard et al. | 236/99 R X |

FOREIGN PATENT DOCUMENTS

| 2165231 | 7/1973 | Germany | 236/42 |
|---|---|---|---|
| 2521161 | 11/1976 | Germany | 236/42 |
| 2613991 | 3/1977 | Germany | 236/42 |
| 3000388 | 7/1981 | Germany | 236/99 R |

Primary Examiner—William E. Tapolcai
Attorney, Agent, or Firm—Bell, Seltzer, Park & Gibson

[57] ABSTRACT

A thermostat system includes a liquid-filled activating device (1), and an operating device (3) which is connected to the activating device by a capillary line (4) and which is adapted to control a heat valve. The activating device (1) includes an annular base plate (10) having a rear surface which is adapted to be mounted against a supporting wall, and the base plate defines a central region which is bounded thereby. A fluid filled housing (8) is mounted to the base plate so as to extend outwardly from the central region and away from the supporting wall, and an axially extending tube (9) is mounted in the housing so as to be axially extended or contracted by the temperature and pressure of the fluid in the housing, and which in turn changes the fluid capacity of the housing and signals the operating device (3). A rotatable knob (5) acts to adjust the length of the tube and thus controls the operating temperature of the system. The fact that the fluid-filled housing and the extendable tube are positioned essentially entirely outside the area bounded by the base plate assures proper circulation of the ambient air to the device and thus a sufficient heat exchange so as to be able to detect the actual room temperature.

20 Claims, 3 Drawing Sheets

LIQUID-FILLED THERMOSTATIC SYSTEM

BACKGROUND OF THE INVENTION

The present invention addresses a liquid-filled thermostatic system for controlling heat valves. The system comprises an activating device which is provided with a pressure control and serves to select a desired temperature and acts as a sensor. The system further comprises an operating device which is detachably mounted onto a valve housing and acts on the heat valve. The activating device is connected to the operating device by means of a capillary tube. The activating device is provided with an adjusting knob, a housing comprising a preferably pot-shaped cover and a bottom, a bellows-type tube coaxially disposed inside the housing and a mounting device for mounting the housing to a wall or the like, said mounting device preferably extending circularly around the housing. Together, the housing and the bellows-type tube form a liquid-containing space of a variable volume. The bellows-type tube has a bottom which can be axially adjusted by means of the adjusting knob and an adjusting device.

Liquid-filled thermostatic systems of the kind in question are already known (DE-PS 21 65 231). In these known systems, the activating device is configured such that at its end facing the adjusting knob, the bellows-type tube which is coaxially disposed inside the housing is via a bearing plate mounted to the adjusting knob. The free end of the bellows-type tube extends in direction of the rear plate of the housing, said rear plate acting as a pressure control. This free end extends considerably into an area of the housing which is surrounded by a mounting device by which it is also more or less insulated from the outside.

Accordingly, at least the front part of the sensor of the known activating device comprising the bellows-type tube and the housing is, on the one hand, affected by radiation from the wall and, on the other, insufficiently ventilated at the walls of the housing. In the known system, it is, hence, not possible to exactly detect room temperatures. On the contrary, the activating device is subject to numerous considerable interferences. Satisfactory temperature control is hence not guaranteed.

It is therefore an object of the invention to provide a liquid-filled thermostatic system for controlling heat valves where the activating device is allowed to react to changes in the room temperature while being largely free from interference and where the control variable derived from the room temperature is fed by said acivating device via the capillary tube to the operating device mounted to the valve housing.

SUMMARY OF THE INVENTION

The above and other objects and advantages of the present invention are achieved in the embodiments described herein by the provision of an activating device which comprises an annular base plate defining a central region which is bounded by the base plate, a housing comprising a pot shaped cover and a bottom wall and so as to define a fluid enclosure therewithin, and a capillary line connected to the housing so as to communicate with the fluid enclosure. The housing is mounted to the base plate with the bottom wall of the housing being adjacent or within the central region of the base plate, and with the cover of the housing extending outwardly a substantial distance beyond the central region of the base plate. An axially extendable bellows-type tube is mounted within the housing so as to define a central axis which is generally perpendicular to the base plate, and the tube has a bottom end, and an opposite free end, with the bottom end being mounted to the bottom wall of the housing and with the free end being positioned axially a substantial distance beyond the central region of the base plate. A knob is rotatably mounted to the base plate and so as to generally surround the housing, and the knob and the free end of the bellows-type tube are interconnected so that rotation of the knob causes the free end to move axially within said housing toward and away from the base plate to thereby change the axial length of the tube and the fluid capacity of the housing.

It has been found that in the system to which the present invention is directed, the sensor extends too far into the area referred to as the mounting area shielding the housing. Because of the mounting device provided therein, it is not possible that a sufficient amount of room temperature, in order to exchange heat, reaches the part of the housing with the pressure control. Accordingly, neither the pressure control nor the sensor operate satisfactory. On the contrary, the pressure control, on the one hand, and the rear part of the bellows-type tube are shielded or insulated from the surrounding area such that they are no longer able to detect the actual room temperature.

Further, it has been found that the above mentioned problems do not occur if the sensor is provided in the housing such that it is fixed mounted to the bottom with its end facing away from the adjusting knob. Inside the housing, the bellows-type tube extends essentially from the bottom outside the area surrounded by the mounting device toward the adjusting knob. The result of this inventive step is that the entire sensor is disposed in an area where the outside wall of the housing is directly exposed to the surrounding atmosphere.

In a particularly advantageous manner, the adjusting device is provided with a control disk. The latter serves as an adjusting means and is disposed outside the housing where it is secured against rotation. This control disk determines the position of the bellows-type tube inside the housing, on the one hand, and the volume taken up by said tube, on the other hand.

Further, the adjusting device has a tensioning device extending from the control disk through the bottom of the housing and the bellows-type tube to the bottom of the latter. This tensioning device connects the bottom of the bellows-type tube to the control disk. The tube, while surrounding the tensioning device, is stationary disposed at the bottom of the housing.

Moreover, the adjusting device cooperates with the control disk via a threaded connection. A turn of the adjusting knob produces an axial movement of the control disk between a first end position, i.e. an end position facing the front end of the adjusting knob, and a second end position, i.e. an end position facing the mounting device. However, since the control disk cooperates with the adjusting knob, its movement can be continued toward the rear end of the activating device. If, then, this movement of the control disk is continued toward the second end position, the tensioning device connecting the bottom of the tube with the control disk compresses the bellows-type tube against the force of a spring. When the control disk assumes its first end position, the bellows-type tube correspondingly expands into its overall length.

From the above statements, it can be understood that in a compressed state, the bellows-type tube takes up a considerably smaller volume than in its fully extended or telescoped state. Accordingly, by adjusting the space and/or the volume taken up by the bellows-type tube and considering the extent of the thermal extension of the liquid contained in the housing, the pressure which builds up in the latter housing can be adjusted at a given temperature, meaning that a certain pressure can be assigned to a certain temperature so as to activate the heat valve.

For the system to operate during temperature changes without substantial loss of time, it is particularly advantageous that the spring, while having initial tension, be provided between the bottom of the tube and bottom of the housing. Taking a certain extension coefficient into account, the intial tension is overcome at given temperatures. In this case, the spring also serves as a pressure control. If temperatures rise to above normal thus producing execessive pressure, the bellows-type tube is compressed against the force of the spring without activating the control disk via the adjusting knob. The mechanism for adjusting the liquid volume remaining inside the housing is in a particularaly advantageous manner used to control excessive temperature or pressure and its easy structural realization does not require additional special devices.

In another advantageous manner, the tensioning device, when accessed from the rear of the control disk or the activating device, can be adjusted by means of a screw-type mechanism which extends through the control disk. A particular advantage thereof is that prior to mounting the activating device to a wall or the like, the system in question can be easily adjusted, preferably via a C° scale, by accessing it from the rear, i.e at a given temperature, it can be adjusted and, hence, calibrated to a certain liquid volume inside the housing.

For an easy mounting of the activating device to a wall while simultaneously insulating said device with respect to the wall, it is particularly advantageous to provide a cover plate for contacting the wall or the like. This cover plate is provided on the one side of the disk which faces away from the adjusting knob and spaced apart therefrom. By providing this cover plate, the liquid-containing housing is insulated via at least two separate air-filled spaces. One of the spaces is found between the bottom of the housing and the control disk, and the second space is located between the control disk and the cover plate. These two air-filled spaces act as an insulation or buffer with respect to the temperature which radiates from the wall and does not correspond to room temperature. Moreover, the cover plate serves as an additional surface for contact with the wall and thus has a stabilizing effect.

With respect to the configuration of the mounting device, it is particularly advantageous if the device and the cover plate together form a type of console. In this case, the mounting device and the cover plate form one structural and functional unit.

The adjusting knob and the mounting device should be rotatably joined to one another via a sap-in connection so that the adjusting knob completely surrounds the housing while its entire outer surface is available for activation. One great advantage of such a snap-in connection is its preventing undesired loosening of the adjusting knob from the housing or the mounting device during turning. The rear part of the adjusting knob could for this purpose be provided with a circular or partially formed groove to receive the projections of the mounting device when the adjusting knob is attached onto the mounting device or when the adjusting knob is inserted into its position in the mounting device. It is, of course, also possible that the respective snap elements are provided vice-versa, i.e. the mounting device could be provided with the groove whereas the adjusting knob would have the corresponding projections or the like.

The tensioning device to connect the bottom of the bellows-type tube to the control disk is subsequently described in greater detail.

This tensioning device could, for example, comprise a telescopic spindle and an adjusting means to adjust the telescopic spindle or fix the position of the telescopic spindle relative to the control disk. A great advantage of an activating device with a telescopic spindle as opposed to an activating device with a rigid spindle is the small height thereof while still providing sufficient stability. In any case, it is essential that the spindle be able to travel approximately 9 mm at maximum temperatures between approximately 55° C. to 60° C.

In addition to the adjusting means, the tensioning device could also have a rope consisting of metal strands. When used instead of the telescopic spindle, this rope would connect the bottom of the bellows-type tube to the control disk. In this example, it would again be the adjusting means which determines the position with respect to the control disk and/or the length of the rope inside the bellows-type tube. The rope could be advantageously consist of cabled metal strands. Finally, instead of a rope, it is also conceivable to use a metal chain to establish the connection between the bottom of the bellows-type tube and the control disk.

As opposed to a telescopic spindle, the use of a rope or a chain has yet another great advantage. Both the rope and the chain can be compressed to a considerably smaller size. As a consequence, the distance by which the bellows-type tube, in its function as a pressure control, can be compressed is significantly increased within the acceptable compressing range of the bellows-type tube. The structrural depth is only of minor importance in this example.

Especially with respect to an extended shelf life, the bellows-type tube is advantageously configured as an extensible metal tube. In such a configuration, the bottom thereof could advantageously be soldered to the actual bellows-type tube or metal tube itself. The result is a perfectly sealed connection between said metal tube and its bottom.

In order to ensure trouble-free ventilation of the outer jacket of the housing, the adjusting knob is in a particularly advantageous manner provided with ventilating openings to supply air to the outer wall of the housing. These ventilating openings are advantageously provided over the entire length, i.e. in axial direction of the adjusting knob.

Apart from the pressure and temperature control established by the bellows-type tube and its "inner life", it is possible to advantageously provide another pressure and temperature control. In the event of excessive temperatures, the aforesaid ventilating openings could be partially closed by a set of gears actuated via the bellows-type tube. In other words, if the pressure control formed by the bellows-type tube were activated, an external pressure control would be activated so as to shield the activating device from the outside so that a temperature change could not affect the activating device. In this event, the ventilating openings could be closed ba means of ventilating flaps. The ventilating openings could also be closed by a sleeve covering said openings at least partially. These sleeves would be put in place from the rear, i.e. from the direction of the wall or, optionally, slid on over the adjusting knob. Since this would require a certain structural depth, the flaps for closing the ventilating openings would extend into a switch cover to be provided behind the activating device, when the latter is in its default position. Such a switch cover provided behind the activating device would be concealed in the wall.

With respect to a selectable room temperature, it is particularly advantageous that a manually operated locking device acts between the adjusting knob and the console so as to prevent a rotation of the adjusting knob in a given position. The adjusting knob is then locked in a position at which it controls a selected temperature. The locking device could comprise a detent cooperating with the console, a projection cooperationg with the adjusting knob and adapted to engage the detent, and a push button or the like also cooperating with the adjusting knob. The detent could then be pushed or moved aside in a particularly advantageous manner by pressing the push button. Finally, the push button serves as an unlocking mechanism. As far as structural design is concerned, the push button is advantageously configured as an integrated component of the adjusting knob.

BRIEF DESCRIPTION OF THE DRAWINGS

Some of the objects and advantages of the present invention having been stated, others will be appear as the description proceeds, when considered in conjunction with the accompanying drawings, in which.

DETAILED DESCRIPTION OF THE PREFERRED EMBODIMENTS

Figure 1:
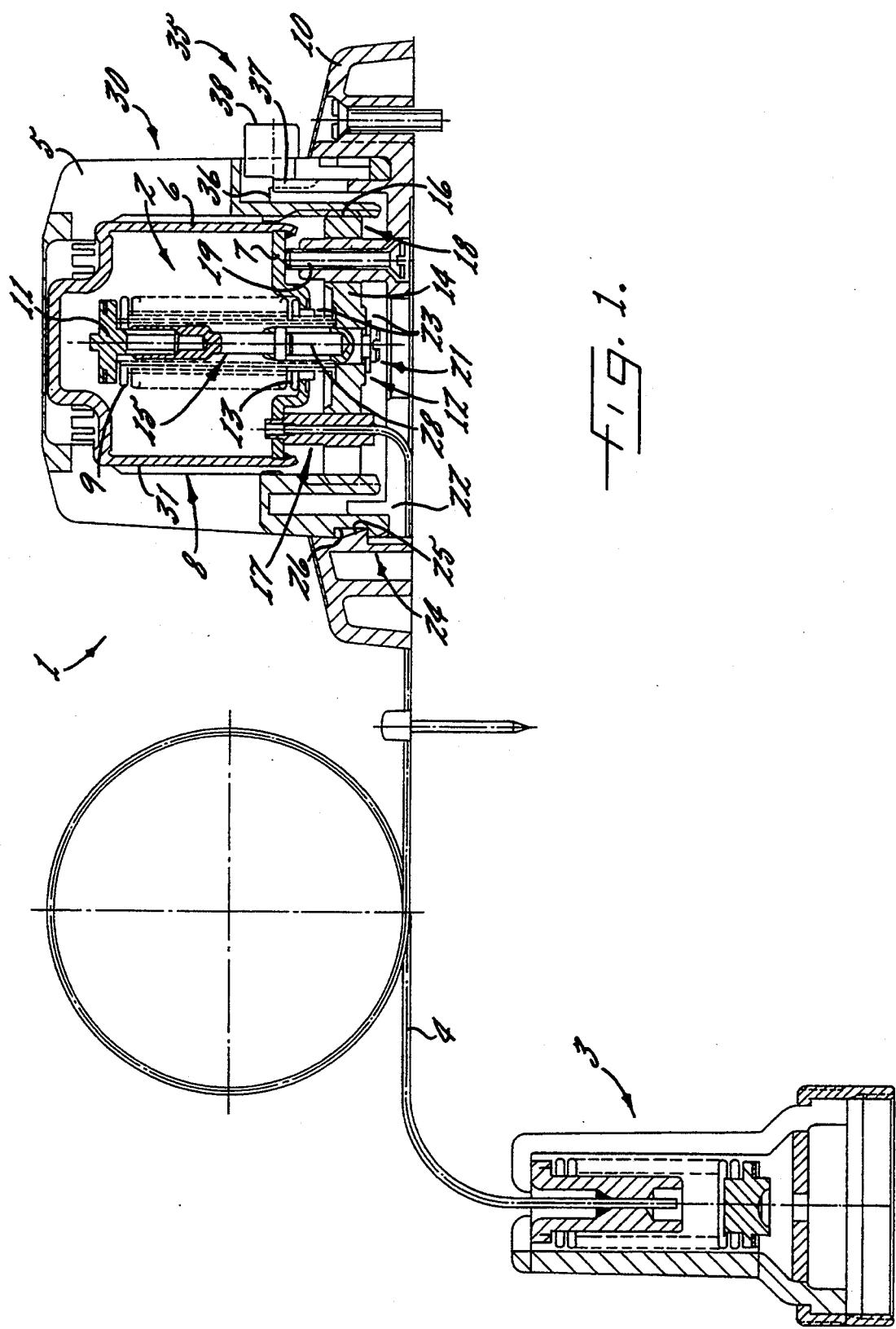
FIG. 1 is a sectional view of a first embodiment of the system in accordance with the invention in which the tensioning device is configured as a telescopic spindle.

In the liquid-filled thermostatic system for controlling heat valves (not shown) according to FIG. 1, the core of the invention is an activating device 1 which serves as a sensor and to select a desired temperature. This activating device 1 is provided with a pressure control 2. Moreover, the system of the invention has an operating device 3 which is detachably mounted onto a valve housing (not shown) and directly acts on the heat valve. A capillary tube 4 connects the activating device 1 to the operating device 3.

Since the present invention addresses first and foremost the configuration of the activating device 1, the specification omits a more detailed description of a known operating device. The same applies to the capillary tube.

Further, FIG. 1 shows in detail that the activating device 1 has an adjusting knob 5 for selecting the desired temperature. This adjusting knob 5 is preferably manufactured in an injection molding process. When assembled, the adjusting knob 5 surrounds a housing 8 comprising a pot-shaped cover 6 and a bottom 7. Inside the housing 8, provision is made for a coaxially disposed bellows-type tube 9.

In order to attach the activating device 1 to a wall or the like, a mounting device 10 is provided for this particular purpose. Said device 10 is disposed in the rear part of the housing 8, i.e. the part of the activating device 1 which faces the wall. Together, the housing 8 and the bellows-type tube 9 form a liquid space with a variable volume. The capillary tube 4 connects said space to the operating device 3 so that the liquid contained therein can be deplaced via the capillary tube 4 into the operating device 3 in the event a temperature change causes the liquid to expand. The bellows-type tube 9 has an axially adjustable bottom 11. This axial adjusting is effected by means of the adjusting knob 5 and the adjusting device 12. To do this, the rotation of the adjusting knob 5 is translated into an axial adjusting movement of bottom 11. This will subsequently be explained in greater detail.

In accordance with the invention, the end 13 of bellows-type tube 9, said end 13 facing away from the adjusting knob 5, is stationary mounted at the bottom 7 of the housing. Inside the housing 8, the bellows-type tube 9 extends from bottom 7 essentially outside the area surrounding the mounting device 10 toward the adjusting knob. This configuration of the invention ensures a disposition of the housing essentially outside the area of the mounting device 10. Accordingly, the mounting device 10 does not shield the housing 8 or any other part of said housing 8. Accordingly, the housing 8 and the liquid contained therein as well as the bellows-type tube 9 are ideally exposed to room temperature.

Figure 2:
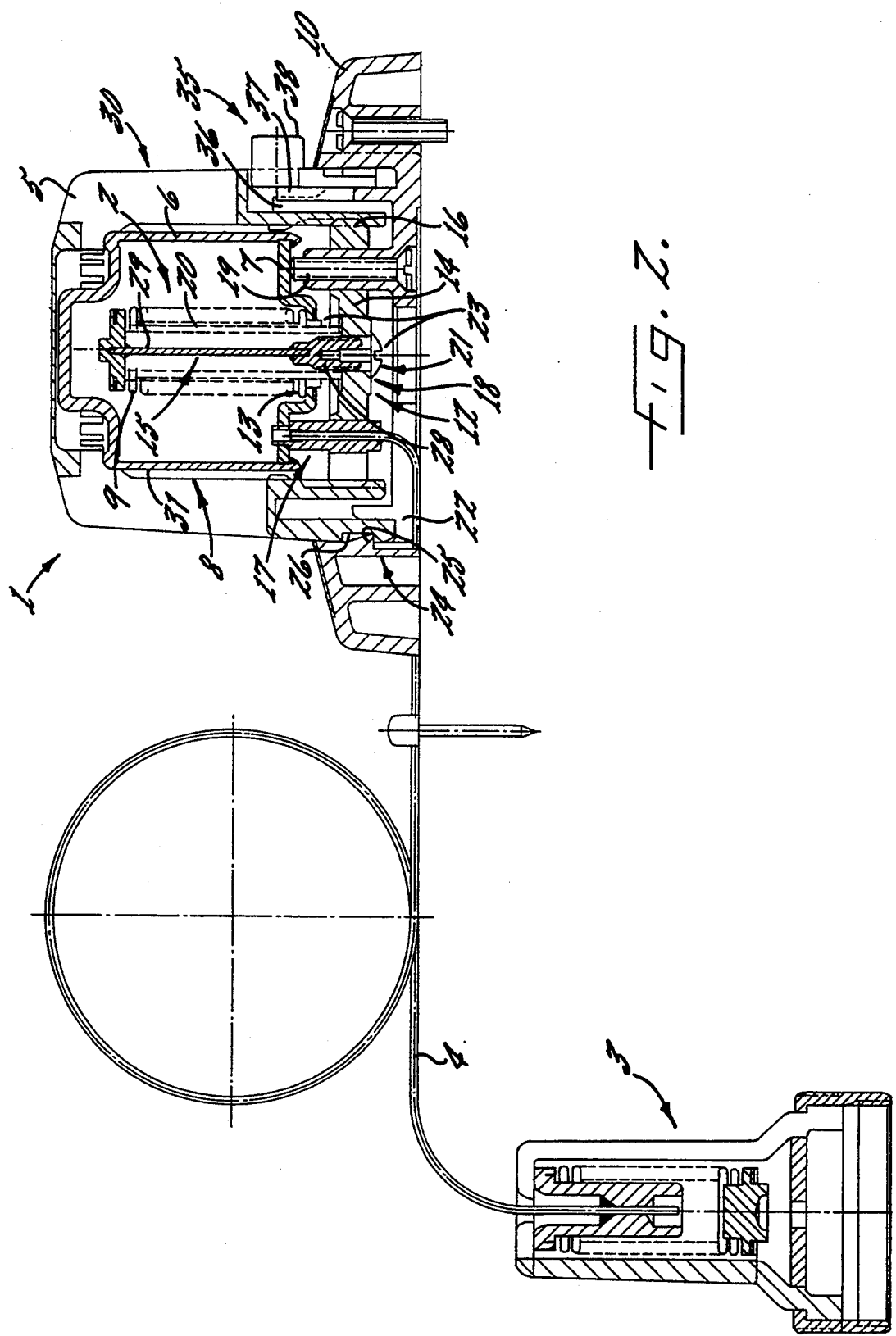
FIG. 2 is a sectional view of a second embodiment of the system in accordance with the invention in which the tensioning device is configured as a rope and FIG. 3 is a sectional view of a third embodiment of the system in accordance with the invention having a second teemperature control.

FIG. 1 and FIG. 2 both show that the adjusting device 12 has a control disk 14. The latter serves as an adjusting means and is disposed outside the housing 8 where it is secured against rotation. Further, said adjusting device 12 is provided with a tensioning device 15 which extends from the control disk 14 through bottom 7 of the housing and through the bellows-type tube 9 to bottom 11. The adjusting knob 5 cooperates with the control disk 14 via a threaded connection 16. By turning the adjusting knob 5, the control disk 14 is axially moved between a first end position 17 and a second end position 18. In other words, a turn of the adjusting knob 5 produces an axial displacement of the control disk and, hence, of the housing 8 including the bellows-type tube 9 contained therein. The threaded connection 16, i.e. the engaging threads 16 provided in the rear part of the adjusting knob 5 and at the edge of the control disk 14, translate the rotation of the adjusting knob 5 into a axial movement.

When the control disk 14 approaches the second end position 18, housing 8, i.e. bottom 7 is urged against an abutment 19, which it permanently contacts. If the movement of the control disk 14 toward the second end position 18 is continued, the tensioning device 15 connecting the bottom 11 to the control disk 14 compresses the bellows-type tube 9 against the force of the spring 20. The control disk 14, via tensioning device 15, pulls at the bottom 11 thus moving the latter in direction toward the second end position 18. Since the housing 8 is urged against the abutment 19, the bellows-type tube 9 is compressed against the force of the spring 20. The volume availabe for containing the liquid inside the housing 8 is, hence, increased. As the control disk 14 approaches its first end position 17, the bellows-type tube 9 attains its maximum length. In this position, the bellows-type tube 9 is not compressed by the tensioning device 15 but has a length resulting from the material of the bellows-type tube 9 itself and the maximum overall length of the tensioning device 15.

In order to provide a certain predetermined force to be overcome when compressing the bellows-type tube 9, the spring 20, when disposed between bottom 11 and the bottom 7, is given an initial tension. The bellows-type tube 9 and the spring 20 disposed therein act as a temperature and pressure control. In the event of excessive temperature which produces excessive pressure, said bellows-type tube 9 is compressed in the liquid against the force of the spring 20 and as a result increases the volume available for the liquid. The spring 20 provided inside the bellows-type tube must, hence, be of such dimensions that the spring 20, prior to being damaged by excessive pressure, is compressed at a pressure where damage is not yet possible, thus avoiding further pressure build-up in the system.

Further, FIGS. 1 and 2 show that, when accessed from the rear of the control disk 14 or the activating device 1, the tensioning device 15 can be adjusted by means of a screw-type mechanism 21 which extends partly through or into the control disk 14. The screw-type mechanism 21 allows calibrating the system and, hence, activating device 21 in that at a given temperature and position of the adjusting knob 5, the volume of housing 8 is altered by reducing or increasing the volume taken up by the bellows-type tube 9.

On the side of the control disk 14 which faces away from the adjusting knob 5, provision is made for a cover plate 22 which is spaced apart from said disk and rests against a wall or the like. On the one hand, this cover plate 22 serves to facilitate contact and mounting of the activating device 1 to the wall. On the other hand, the cover plate 22 has the advantage that air-filled spaces 23 between the bottom 7 and the control disk 14 and also between the control disk 14 and the cover plate 22 insulate the liquid-containing housing 8 with respect to the wall. Accordingly, in the system of the invention, the usually colder wall does not simulate a temperature different from the actual room temperature. The activating device 1, hence, always operates correctly.

Further, the Figs. also show that the cover plate 22 is connected to the mounting device 10 with the cover plate 22 being an integrated component of the mounting device 10. The mounting device 10 and the cover plate 22 could be formed as one single part in an injection moulding process. In this case, the mounting device 10 and the cover plate 22 form a type of console.

In order to secure a selected position of the activating device 1 with the adjusting knob 5 so as to prevent the latter from coming loose from mounting device 10, the adjusting knob 5 and the mounting device 10 are rotatably connected to one another by means of a snap-in mechanism 24. Any conceivable snap-in mechanism will fit this purpose, provided it allows a rotating movement between the adjusting knob 5 and the mounting device 10.

In the embodiment illustrated in the Figs., the mounting device 10 has a projection 25 snapping in a recess 26 at the adjusting knob 5 when the latter is plugged in. The activating device 1 and the adjusting knob 5 could be configured such that the snap-in mechanism 24 is disengaged with the aid of a special tool prizing the projection 25 out of the recess 26.

In the embodiment of FIG. 1, the tensioning device 15 has a telescopic spindle 27 and an adjusting piece 28. The adjusting piece 28 and the screw-type mechanism 21 are used to select the volume of the housing 8 by adjusting the volume for the bellows-type tube 9.

In the embodiment of FIG. 2, the tensioning device 15 has a rope and an adjusting piece 28 as shown in the embodiment of FIG. 1. The rope consists of metal strands. As compared to the embodiment of FIG. 1, this one has the great advantage of being less complicated with respect to structure and, on the other hand, being configured such that when the bellows-type tube 9 is compressed, the rope 29, due to excessive pressure, can fold up inside the bellows-type tube on a minimum of space. Thus, said rope 29 does not interefere with the compression of the bellows-type tube 9 inside the acceptable, damage-free, space determined by the bellows-type tube 9 itself. The tensioning device 15 could also be provided with a chain, preferably metal, and also with an adjusting piece 28. The advantages of such a configuration are similar to those mentioned in connection with embodiment of FIG. 2.

The bellows-type tube 9 illustrated in both Figs. is configured as an extensible metal tube. The bottom 11 thereof is soldered to the actual extensible tube 9 so as to ensure that the interior thereof is a well-sealed.

For the room temperature to freely influence the activating device 1, i.e. ensuring that the room temperature can directly act on the housing 8 and, hence, on the liquid contained therein, the adjusting knob 5 is in a particularly advantageous manner provided with ventilating openings 30 to supply air to the outer wall 31 of the housing 8. These ventilating openings may be configured as bores or slots.

Figure 3:
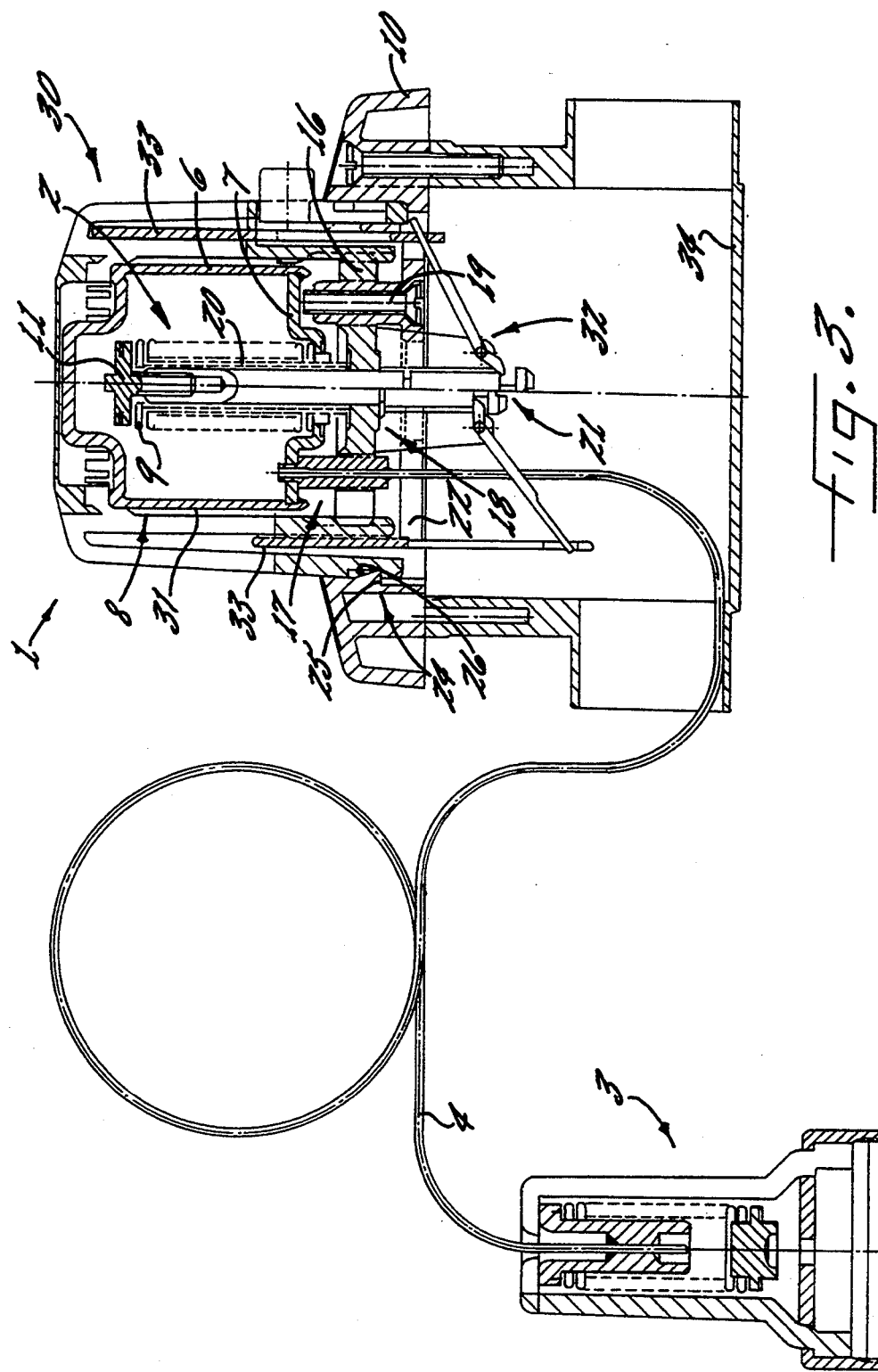

As seen in FIG. 3, excessive temperature or pressure of the liquid contained in housing 8 can cause the ventilating openings 30 to be at least partially closed by a set of gears 32 actuated via the bellows-type tube 9. The purpose of closing the ventilating openings 30 is to prevent the elevated room temperature from further increasing the pressure build-up inside the housing 8 thus damaging the system. In order to stop the room temperature from affecting the housing 8 and the liquid contained therein, the ventilating openings 39 are closed, for example, by means of ventilating flaps. These ventilating openings 30 could alternatively also be closed by means of sleeves which cover said openings 30 at least partially. If, however, the pressure and temperature control is not activated, these flaps or sleeves 33 for closing the ventilating openings 30 would have to extend into a switch box 34 to be provided behind the activating device 1 and, preferably, concealed in the wall.

All FIGS. 1 to 3 show that between the adjusting knob 5 and the console, there acts a manually operated locking device 35 preventing a rotation of the adjusting knob 5 in a given position. The adjusting knob 5 is locked once it is in the position which controls the desired temperature. This is a particularly effective way of protecting a temperature selection from undesired changes, e.g. by children. The selection can be easily realized with the aid of the screw-type mechanism 21.

The locking device 35 has a detent 36 cooperating with the console, a projection 37 cooperating with the adjusting knob 5 and a push button 38 or the like also cooperating with the adjusting knob 5. When pressing the push button 38 or the like, the abutment 36 is pushed or moved aside; the push button 38, hence, serves as a disengaging mechanism.

Finally, it can also be understood from the Figs. that the push button 38 or the like is an integrated part of the adjusting knob 5.

I claim:

1. An activating device (1) which is adapted for controlling an operating device (3) which is positioned to control a heat valve, and comprising
   an annular base plate (10) defining a central region which is bounded by the base plate,
   a housing (8) comprising a pot shaped cover (6) and a bottom wall (7) and so as to define a fluid enclosure therewithin,
   a capillary line (4) connected to said housing so as to communicate with said fluid enclosure,
   means mounting said housing to said base plate with said bottom wall being adjacent or within said central region of said base plate, and with said cover extending outwardly a substantial distance beyond said central region of said base plate,
   an axially extendable bellows-type tube (9) mounted within said housing so as to define a central axis which is generally perpendicular to said base plate, said tube having a bottom end (13), and an opposite free end (11), with said bottom end being mounted to said bottom wall of said housing and with said free end being positioned axially a substantial distance beyond said central region of said base plate,
   a knob (5) rotatably mounted to said base plate and so as to generally surround said housing, and
   means (12) interconnecting said knob and said free end of said bellows-type tube so that rotation of said knob causes said free end to move axially within said housing toward and away from said base plate to thereby change the axial length of said tube and the fluid capacity of said housing.

2. The activating device as defined in claim 1 wherein said interconnecting means (12) comprises a control disk (14) mounted to said base plate for movement in the direction of said central axis and on the side of said bottom plate (7) opposite said cover (6).

3. The activating device as defined in claim 2 wherein said interconnecting means (12) further comprises a tensioning member (15) extending along said central axis from said control disk (14) through said bottom wall (7), through said tube (9), and to said free end (11) of said tube.

4. The activating device as defined in claim 3 wherein said interconnecting means (12) further comprises a threaded interconnection (16) between said knob (5) and said control disk (14), and guide means for precluding rotation of said control disk while permitting movement thereof in said axial direction between first and second end positions (17, 18).

5. The activating device as defined in claim 4 wherein said interconnecting means (12) further comprises a coil spring (20) coaxially disposed about said central axis and between said bottom wall (7) and said free end (11), and such that movement of said control disk toward its second position (18) tends to contract the axial length of said tube (9) against the compression force of the spring.

6. The activating device as defined in claim 1 wherein said interconnecting means (12) further comprises an adjustment member (21) accessible on the side of said control disk (14) opposite said housing (8) for adjusting the axial positioning of said tensioning device (15).

7. The activating device as defined in claim 6 wherein said tensioning member (15) comprises a telescopic spindle (27) and an adjusting piece (28) which is threadedly connected to said adjustment member (21).

8. The activating device as defined in claim 6 wherein said tensioning member (15) comprises a flexible cable (29) and an adjusting piece (28) which is threadedly connected to said adjustment member (21).

9. The activating device as defined in claim 6 wherein said tensioning member (15) comprises a flexible chain and an adjusting piece (28) which is threadedly connected to said adjustment member (21).

10. The activating device as defined in claim 1 further comprising a cover plate (22) mounted to said base plate on the side of said central disk (14) opposite said housing, and so as to leave an air space between said central disk and said cover and thereby insulate the housing from a supporting wall upon which the base plate (10) is adapted to be mounted.

11. The activating device as defined in claim 1 wherein said knob (5) is rotatably mounted to said base plate (10) by means of a snap-type interengaging member (24).

12. The activating device as defined in claim 1 wherein said tube (9) is composed of a metal.

13. The activating device as defined in claim 12 wherein said bottom end (13) of said tube is sealably joined to said bottom plate (7).

14. The activating device as defined in claim 1 wherein said knob (5) includes a circumferential wall which surrounds said cover of said housing, and wherein said circumferential wall includes a plurality of circumferentially spaced apart ventilating openings (30) to permit air to freely circulate to said cover.

15. The activating device as defined in claim 14 further comprising closure means (33) for selectively at least partially closing said ventilating openings.

16. The activating device as defined in claim 15 wherein said closure means comprises a sleeve (33) mounted for axially movement about said cover of said housing.

17. The activating device as defined in claim 16 wherein said closure means further comprises lever arm means (32) which is operatively connected between said tube (9) and said sleeve.

18. The activating device as defined in claim 1 further comprising a switch box (34) mounted to the side of said base plate opposite said housing and which is adapted to be positioned behind a supporting wall.

19. The activating device as defined in claim 1 further comprising a manually operable locking means (35) acting between said knob and said base plate for selectively preventing the knob from rotating about said central axis.

20. The activating device as defined in claim 19 wherein said locking means (35) comprises a detent (36) on said base plate, a projection (37) on said knob and adapted to engage said detent, and a push button (38) on one of said base plate and knob for selectively disengaging the detent and the projection.

* * * * *